United States Patent
Sidhu et al.

(10) Patent No.: US 12,196,158 B2
(45) Date of Patent: Jan. 14, 2025

(54) MULTIMODE PROPULSION SYSTEM

(71) Applicant: PHASE FOUR, INC., Hawthorne, CA (US)

(72) Inventors: Jesse Sidhu, Rancho Palos Verdes, CA (US); Mohammed Umair Siddiqui, Inglewood, CA (US); Derek Thompson, Los Angeles, CA (US); Jason Jackson Wallace, Pasadena, CA (US)

(73) Assignee: PHASE FOUR, INC., Hawthorne, CA (US)

( * ) Notice: Subject to any disclaimer, the term of this patent is extended or adjusted under 35 U.S.C. 154(b) by 0 days.

(21) Appl. No.: 18/497,442

(22) Filed: Oct. 30, 2023

(65) Prior Publication Data

US 2024/0263599 A1 Aug. 8, 2024

Related U.S. Application Data

(60) Provisional application No. 63/381,726, filed on Oct. 31, 2022.

(51) Int. Cl.
*F02K 9/44* (2006.01)
*B64G 1/40* (2006.01)
(Continued)

(52) U.S. Cl.
CPC .............. *F02K 9/44* (2013.01); *B64G 1/401* (2013.01); *B64G 1/402* (2013.01); *B64G 1/411* (2023.08);
(Continued)

(58) Field of Classification Search
CPC ........ B64G 1/401; B64G 1/402; B64G 1/405; B64G 1/411; B64G 1/413; B64G 1/415;
(Continued)

(56) References Cited

U.S. PATENT DOCUMENTS 4,880,185 A * 11/1989 Apfel ..................... B64G 1/402
244/135 B
5,148,674 A * 9/1992 Morris ..................... F02K 9/56
60/39.27

(Continued)

OTHER PUBLICATIONS

Kingsbury, Nancy, Air Force Stock Fund Hydrazine Sales Consistent With the Commercial Space Launch Act, May 1991 (Year: 1991).*

(Continued)

*Primary Examiner* — Kyle Robert Thomas
(74) *Attorney, Agent, or Firm* — Steinfl + Bruno LLP

(57) ABSTRACT

Systems and methods for a multimode propulsion system (MMPS) are presented. The MMPS includes a chemical thruster, an electric thruster, and a shared propellant tank. The MMPS further includes a propellant decomposition chamber that transforms, via a catalytic and/or electrolytic process, the propellant from the tank into vapor form for use as gas propellant by the electric thruster. The electric thruster can be configured for targeted ionization of one or more constituent species present in the vapor form of the propellant. Flow activation/control from the tank to the chemical and electric thrusters is provided by a fluidic feed system. The branches include a check valve and a pressure regulator in series connection. A normally closed squib valve prevents propellant flows/leaks from the tank to either the chemical or the electric thrusters when the MMPS is not in operation.

24 Claims, 8 Drawing Sheets

(51) Int. Cl.
*F02K 9/42* (2006.01)
*F02K 9/58* (2006.01)
*F02K 9/60* (2006.01)
*F02K 9/68* (2006.01)
*F02K 9/76* (2006.01)

(52) U.S. Cl.
CPC ............. *B64G 1/413* (2023.08); *B64G 1/415* (2023.08); *F02K 9/42* (2013.01); *F02K 9/58* (2013.01); *F02K 9/605* (2013.01); *F02K 9/68* (2013.01); *F02K 9/76* (2013.01)

(58) Field of Classification Search
CPC ...... F02K 9/42; F02K 9/44; F02K 9/58; F02K 9/605; F02K 9/68; F02K 9/76
See application file for complete search history.

(56) References Cited

U.S. PATENT DOCUMENTS

| | | | | |
|---|---|---|---|---|
| 5,282,357 | A * | 2/1994 | Sackheim | F02K 9/42 60/257 |
| 5,819,526 | A * | 10/1998 | Jackson | F02K 9/56 60/39.462 |
| 9,145,216 | B2 * | 9/2015 | Gascon | F03H 1/0062 |
| 11,067,065 | B2 | 7/2021 | Siddiqui et al. | |
| 11,231,023 | B2 * | 1/2022 | Siddiqui | B64G 1/402 |
| 11,325,727 | B2 | 5/2022 | Longmier et al. | |
| 11,365,016 | B2 | 6/2022 | Longmier et al. | |
| 2019/0107104 | A1 * | 4/2019 | Siddiqui | F03H 1/0093 |

OTHER PUBLICATIONS

Gagne, R. et al., "A Dual Mode Propulsion System for Small Satellite Applications" Aerospace, 5, 52; Published May 2, 2018. doi:10.3390/aerospace5020052. 22 pages.

Rovey, L. et al., "Review of Chemical-Electric Multimode Space Propulsion" American Institute of Aeronautics and Astronautics. 2019. 23 pages.

Rovey, L. et al., "Review of multimode space propulsion" Progress in Aerospace Sciences. vol. 118, 2020, 100627, ISSN 0376-0421. https://doi.org/10.1016/j.paerosci.2020.100627. 23 pages.

* cited by examiner

MULTIMODE PROPULSION SYSTEM

CROSS-REFERENCE TO RELATED APPLICATIONS

The present application claims priority to U.S. Provisional 63/381,726 filed on Oct. 31, 2022, the disclosure of which is incorporated herein by reference in its entirety.

STATEMENT OF GOVERNMENT GRANT

This invention was made with government support under Grant No. FA881021C0047 awarded by U.S. Space Force and AFWERX. The government has certain rights in the invention.

TECHNICAL FIELD

The present disclosure relates to propulsion systems. More particularly, it relates to multimode propulsion systems that include two or more propulsive modes (e.g., thruster types) into a system that shares a common propellant.

BACKGROUND

Multimode propulsion may refer to the combination of two or more propulsive modes into a system that shares a common (e.g., single) propellant, providing more flexibility and performance than traditional propulsion systems, including selective operation for high thrust (e.g., high acceleration) or high specific impulse (e.g., high efficiency). Typically, the two propulsion modes include a chemical propulsion mode and an electric propulsion mode.

Some prior implementations of multimode propulsion systems in spaceflight have used monopropellant "electrospray" thrusters for the electric propulsion element of the subsystem. Such multimode systems can be switched between chemical monopropellant and capillary electrospray propulsion modes. However, such electrospray multimode propulsion systems have drawbacks and are becoming less desirable because they are extremely low thrust. This limitation prevents electrospray multimode systems from being implemented in most in-space propulsion applications.

Other implementations of chemical-electric multimode propulsion systems in spacecraft have attempted to use microtube-electrospray paired systems. The microtube concept decomposes monopropellant within narrow channels lined with a catalyst. When heated in the presence of the catalyst, the propellant undergoes exothermic decomposition, exhausting at high temperatures, i.e., as chemical mode thrust. If instead a potential is applied across the channel, electrostatic acceleration of the liquid produces thrust. The microtube-electrospray approach has the advantage of deploying a single thruster, but the performance and high voltage supplies required for this application may prohibit the development of cost-effective propulsion systems.

Other prior implementations of multimode propulsions in spaceflight have also previously been limited to arcjet systems. These arcjet systems operate using an electrical discharge to create an arc, wherein a liquid propellant (e.g., hydrazine) is passed through the thruster chamber & electrodes to convert it into a heated compressible gas. The hot gas is then thermodynamically expanded through a nozzle. Arcjets have primarily operated on hydrazine and ammonia, the former a propellant used in monopropellant and bipropellant chemical propulsion systems. However, these systems have drawbacks because they too are limited in performance (thrust and/or specific impulse) and lifetime, mainly due to the exposure of the arcjet's electrode to the propellant causing chemical erosion. Furthermore, as with electrospray systems, an arcjet's reliance on extremely high power and high voltage electronics may prohibit the development of cost-effective propulsion systems.

Other implementations of chemical-electric multimode propulsion systems in spacecraft have considered microwave electrothermal or micro-resistojet propulsion systems. Specifically, these systems have also attempted to operate (solely) on liquid water as fuel and provide thrust in the range of millinewtons (mN) in different propulsion applications for micro, nano, and picosatellites (e.g., CubeSats™, PocketQubes™). Micro-resistojet thrusters (e.g., vaporizing liquid micro-resistojet, VLM), are based on vaporization and heating of pressurized liquid water, followed by expansion in a nozzle. However, therein lies the rub for why these micro-resistojet thrusters are less desirable. Microwave electrothermal thrusters generate plasma using microwave-frequency electromagnetic waves. This plasma is then accelerated through a nozzle, producing thrust. Due to the reliance on vaporization and heating, both micro-resistojet and microwave electrothermal multimode propulsion systems compromise in propellant selectivity (e.g., for the chemical thruster) to comply with requirements for the electric propulsion mode. Furthermore, microwave-based propulsion systems' supporting power electronics are very inefficient, generating a significant amount of waste heat and increasing the power input requirements for the system, which may prohibit the development of cost-effective propulsion systems with these technologies.

Combined chemical-electric propulsion systems are desirable for many reasons. Such combined chemical-electric propulsion systems can exist in a "multimode" configuration where different types of electric propulsion thrusters are combined with chemical monopropellant thrusters while utilizing a shared/common propellant. Therefore, multimode in-space propulsion systems ultimately reduce mass, volume, and power requirements on a spacecraft to enable desired benefits such as (but not limited to) increased payload capacity, mission flexibility, extended launch windows, shorter interplanetary transfers, high thrust maneuvers, and high efficiency to sustain mission operations. More specifically, for long interplanetary missions that require selective high-thrust/low-thrust propulsion capabilities, multimode enables the ability to efficiently fulfill the orbital maneuver requirements of such long missions. Current efforts in the art include development of multimode propulsion systems that include small chemical thrusters (1N, 4N, etc.) with electrospray thrusters designed for a specific propellant (e.g., green, low toxicity, AF-M3 15E—ASCENT, high purity hydrazine—HPH, etc.), however such efforts have not yet materialized. Current industry stop-gap solutions for multimode propulsion systems using such green propellants are effectively hybrid propulsion systems which use two different propellants, one for each of the propulsion modes (e.g., hydrazine/nitrogen tetroxide for the chemical propulsion and xenon for the electric propulsion).

Teachings according to the present disclosure address the above limitations of the currently known multimode propulsion systems by combining a chemical thruster with an (electrodeless) electrothermal radio frequency (RF) thruster. In other words, the teachings of the present disclosure are applicable to propulsion systems that use chemical reactions to obtain thrust and to propulsion systems that use radio frequency electromagnetic signals to obtain heating of particles and consequent generation of thrust to be used, for example, in the field of satellite propulsion.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure. Same reference designators refer to the same features.

DETAILED DESCRIPTION

Figure 1:
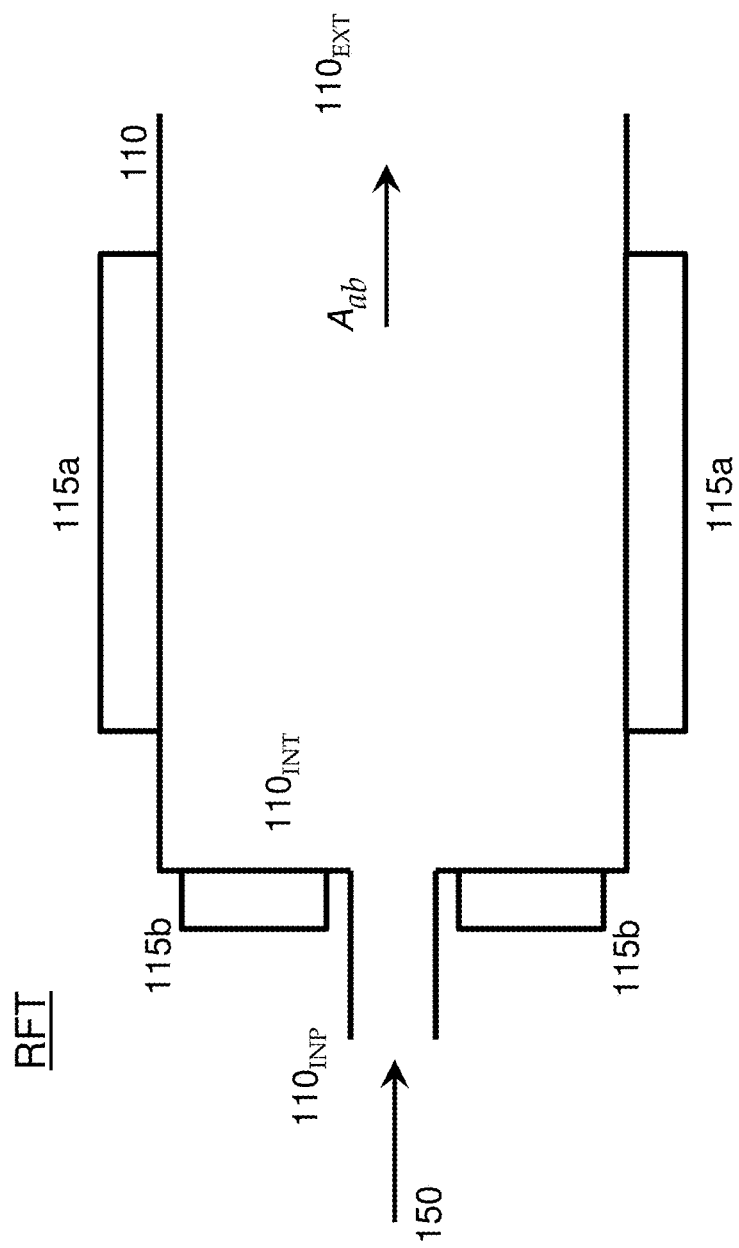
FIG. 1 shows a simplified cross-sectional view of an electrodeless and electrothermal RF thruster used in a multimode propulsion system (MMPS) according to the present disclosure.

The multimode propulsion system (MMPS) according to the present disclosure is compatible with any chemical thruster (also known as combustion thruster) known in the art. As known by a person skilled in the art, a chemical thruster, CT, includes a combustion chamber wherein burning of a propellant produces heat and pressure to create an exhaust gas that shoots out a nozzle/exit of the thruster to provide thrust. It is noted that a detailed description of such known in the art chemical thruster is beyond the scope of the present disclosure.

The multimode propulsion system (MMPS) according to the present disclosure provides flexibility in selection/type of a common propellant used to operate a chemical thruster, CT, and an electrodeless electric thruster. Such flexibility may be provided via use of a propellant catalyst that chemically decomposes the common propellant from a liquid (or solid) form that may be used by the chemical thruster to a gaseous form that may be used by the electric thruster. As described later in the present disclosure (e.g., with reference to FIG. 3A), further flexibility in the selection/type of the common propellant may be provided by a reaction chamber for the propellant catalyst that may include a modular catalyst bed to allow for different methods of decomposition of the common propellant, including catalytic or joule heating, optimized for the selected/type of the common propellant.

The multimode propulsion system (MMPS) according to the present disclosure may therefore allow chemical propellants that are optimized for use with traditional chemical thrusters, CTs, to be used with electrodeless electric thrusters which do not rely on thermal expansion of a gas through a nozzle. Accordingly, and in contrast to known in the art multimode applications, the MMPS according to the present disclosure may allow for increased levels of efficiency (i.e., specific impulse, e.g., greater than 800 seconds) when compared to, for example, the above mentioned resistojets and arcjets that have been used in hydrazine multimode applications (which are specific to very high power, e.g., 4 KW and higher, applications with generally low specific impulse).

The multimode propulsion system (MMPS) according to the present disclosure may provide flexibility in tunability of the decomposed gas via a storage tank (e.g., vapor storage zone of FIG. 3A later described) where the decomposed gas may be stored and tuned in view of specific operating parameters of the electric thruster, including for example, temperature and pressure. Flexibility in tunability of other operating parameters may be provided, including burn duration, via, for example, sizing of the storage tank. Optionally, in some embodiments according to the present disclosure, the storage tank may include a first stage (e.g., vapor storage zone of FIG. 3A later described) that directly interfaces with the reaction chamber to receive the decomposed gas, and a second stage (e.g., additional/external vapor storage chamber/tank, GTK of FIG. 2B later described) where the decomposed gas is accumulated and tuned for feeding of the electric thruster. Because the decomposition of the common propellant to an amount/mass of the decomposed gas that is fed to the first stage may be faster than the burning/consuming of the same amount/mass of the decomposed gas from the second stage by the electric thruster, such implementation may allow a continuous/extended operation of the electric thruster.

Although not limited to a specific kind of electric thruster, the multimode propulsion system (MMPS) according to the present disclosure preferably uses an electrodeless and electrothermal RF thruster, RFT, that is a specific type of electric thruster. Description, including structures and principle of operation, of the (electrodeless and electrothermal) RF thruster, RFT, used in the present multimode propulsion system (MMPS) may be found in, for example: U.S. patent application Ser. No. 14/914,056 filed on Feb. 24, 2016; U.S. patent application Ser. No. 14/914,065 filed on Feb. 24, 2016; U.S. patent application Ser. No. 16/165,138 filed on Oct. 19, 2018; U.S. patent application Ser. No. 16/439,205 filed on Jun. 12, 2019; and U.S. patent application Ser. No. 17/635,677 filed on Feb. 15, 2022, disclosures of all which are incorporated herein by reference in their entirety.

As can be clearly taken from the above referenced papers, and as simplistically rendered in FIG. 1, the RF thruster, RFT, used in the present multimode propulsion system (MMPS) includes a (cylindrical/tubular) plasma liner (110, e.g., plasma production chamber) having an interior space ($110_{INT}$), a neutral propellant entry ($110_{INP}$), and an ionized propellant exit ($110_{EXT}$). Furthermore, the RF thruster, RFT, includes an antenna system (115a, 115b) that is arranged outside of the plasma liner (110), the antenna system (115a, 115b) coupled to an RF source (not shown) for generation of RF fields, through the antenna system (115a, 115b), in the interior ($110_{INT}$) region of the plasma liner (110). Neutral gas propellant (150) that is delivered to the interior ($110_{INT}$) of the plasma liner (110) of the RF thruster, RFT, is heated and ionized by inductive coupling (e.g., inductive heating) through RF fields that are generated at the inside ($110_{INT}$) of the plasma liner (110) by the antenna system (115a, 115b). Accordingly, the neutral propellant (150) is ionized into electrons and positively charged propellant ions which are further heated by the RF fields. Since the electrons have a much smaller mass compared to the ions, the electrons undergo a rapid flux towards the exit ($110_{EXT}$) of the plasma liner (110) which in turn creates a momentary charge imbalance in the interior space ($110_{INT}$) of the plasma liner (110). The slower positively charged propellant ions are then pushed out of the plasma liner (110) via the charge imbalance at a rate sufficient to satisfy overall ambipolar fluxes of particles out of the plasma liner (110), and therefore of the RF thruster, RFT, thereby producing thrust.

It is noted that contrary to other known in the art electrothermal electric thrusters (e.g., electron cyclotron resonance thrusters) that may include RF field generation for creating tightly controlled resonant effects inside of a plasma liner to heat and accelerate particles, the ion acceleration (i.e., ambipolar acceleration, $A_{ab}$) generated by the charge imbalance in the RF thruster, RFT, used in the present multimode propulsion system (MMPS) is the primary source of thrust. Efficiency in operation of the present RF thruster, RFT, can allow a performance that includes a thrust in a range from about 5 mN to about 30 mN, and in particular a thrust in a range from about 15 mN to about 25 mN, while providing a specific impulse in a range from about 400 seconds to about 1500 seconds, and in particular a specific impulse that is greater than 800 seconds.

Figure 2A:
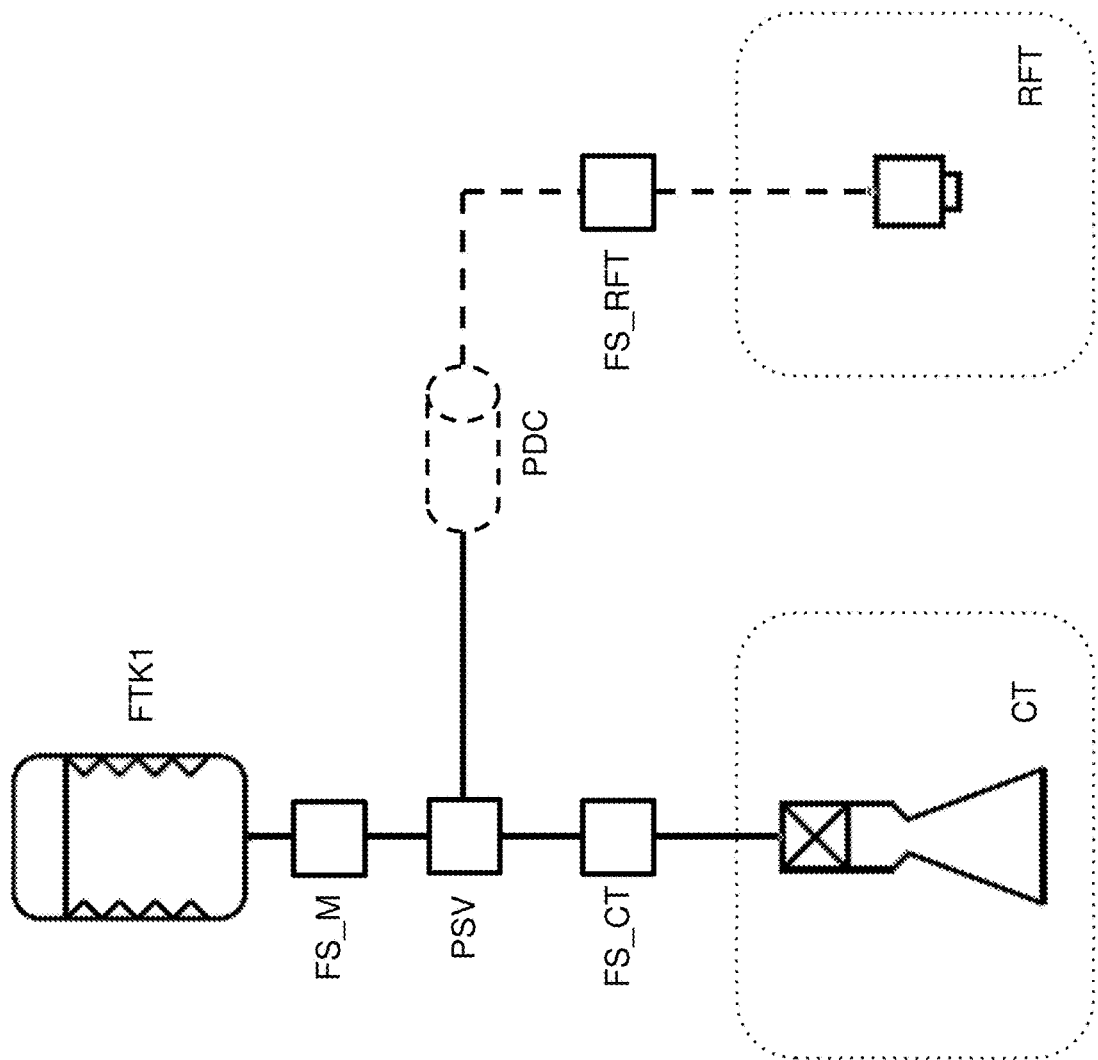
FIG. 2A shows a simplified block diagram of a multimode propulsion system (MMPS) according to an embodiment of the present disclosure.

FIG. 2A shows a simplified block diagram of the multimode propulsion system (multimode propulsion system (200A, MMPS) according to an embodiment of the present disclosure. As shown in FIG. 2A, the multimode propulsion system (MMPS) according to the present teachings uses a combination of a chemical thruster/propulsion, CT, to provide high thrust, and an (electrodeless) electrothermal RF thruster, RFT, to provide high specific impulse, both thrusters sharing a same (e.g., common) propellant stored in a propellant tank, FTK1. It is noted that the sharing of the same propellant may advantageously allow reduction in overall propellant and propulsion subsystems mass/volume fractions while providing a dual mode operation capability (high thrust and high specific impulse).

Because the RF thruster, RFT, used in the present multimode propulsion system (MMPS) is electrodeless and electrothermal, it may be configured to operate from (e.g., ionize) a large variety of gas species, whether single- or multi-species, and including noble or non-noble gas, while providing sufficient efficiency and thrust for operation of the present multimode propulsion system (MMPS) in a high specific impulse mode. For example, a particular single- or multi-species propellant gas may be ionized and accelerated via different settings and/or configurations of the RF thruster, RFT, including, for example, and RF power of the RF fields generated inside of the plasma liner, an RF antenna design, and/or a plasma liner geometry, etc. In other words, the RF thruster, RFT, of the present multimode propulsion system (MMPS) may allow targeted ionization of various gas species, whether fed to the RF thruster, RFT, in single-species form (e.g., pre-filtered after decomposition by propellant decomposition chamber, PDC, later described) or multi-species form. Some nonlimiting examples of such various gas species may include any one or more of: $H2O$ (water vapor), $CO2$ (carbon dioxide), $C2$ (dicarbon), $N2$ (nitrogen), xenon, or krypton.

The (shared, common) propellant used in the present multimode propulsion system (MMPS) may be stored in, for example, liquid form in the propellant tank, FTK1, and used in the liquid form by the chemical thruster, CT, and in vaporized form (i.e., gas) by the (electric) RF thruster, RFT.

According to an exemplary embodiment of the present disclosure, the propellant tank, FTK1, of FIG. 2A may be a bellow fuel tank which by virtue of one or more bellows attached to the tank advantageously allows: (absolute) tank pressure of up to 400 PSIA (MEOP, industry standard); refueling of the tank without loss of pressurant (e.g., helium); mitigation of pressurant entrainment into branches/lines of a propellant feed system (e.g., FS_M later described); and tight space vehicle center of gravity (SVCG) control with high propellant expulsion efficiency. It is noted that such configuration of the propellant tank, FTK1, including the provided refueling capability, may advantageously allow reduction in overall propellant and propulsion subsystems mass/volume fractions as any necessary propellant may be incrementally added at different times. It is noted that the size/capacity of the propellant tank, FTK1, may be scalable and according to performance goals (e.g., burn/thrust duration) of the multimode propulsion system (MMPS). According to some nonlimiting examples, such size/capacity may be as small as one kilogram, and as large as hundreds of kilograms, of equivalent liquid propellant mass. It should be noted that use of a shared/common propellant that is in liquid form may represent an exemplary embodiment of the present disclosure which should not be considered as limiting the scope of the present teachings. According to some embodiments of the present disclosure, the shared/common propellant may be in solid form.

Some nonlimiting examples of the shared/common propellant stored in the propellant tank, FTK1, may include any one or more of: HPH (High Purity Hydrazine), AF-M315E (ASCENT), HTP (high test peroxide), NTO (nitrogen tetroxide), and (ammonium dinitramide), or LMP-103S (Ammonium Dinitramide Liquid Monopropellant). Further nonlimiting examples of the shared/common propellant stored in the propellant tank, FTK1, may include any one or more of: RFNA (red fuming nitric acid), N2O (nitrous oxide), MMH (mono-methyl-hydrazine), C2H6 (ethane), or kerosene.

According to an embodiment of the present disclosure, the multimode propulsion system (MMPS) includes a catalytic/electrolytic propellant decomposition subsystem (PDC of FIG. 2A, further details shown in FIG. 3A), also referred herein as a propellant decomposition chamber (PDC), that is configured to transform the liquid form of the propellant from the tank, FTK1, into the vaporized form used by the RF thruster, RFT. In other words, the propellant decomposition chamber, PDC, decomposes, or partially decomposes, the liquid form of the propellant into one or more constituent gases/species via a combination of catalytic and/or electrolytic processes. In turn, the one or more (decomposed, partially decomposed) constituent gases (e.g., species), or some (e.g., one) of those gases, may be fed to the RF thruster, RFT, for ionization (and acceleration/thrust). It is noted that in all of the figures of the present disclosure, including in FIG. 2A, solid lines between the various shown block components indicate flow of propellant in the liquid form, whereas dotted/broken lines indicate flow of propellant in the gaseous form.

Figure 2B:
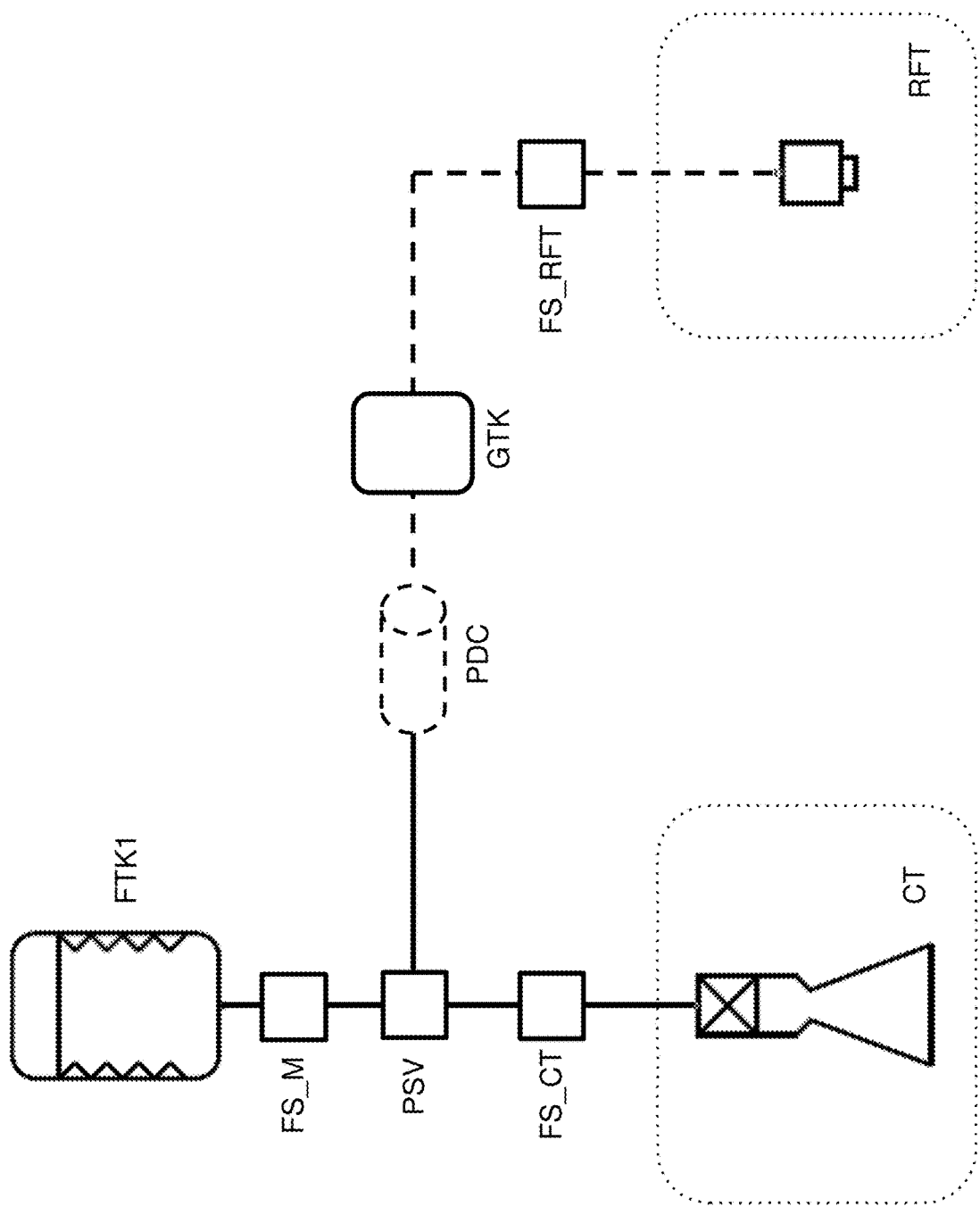
FIG. 2B shows a simplified block diagram of a multimode propulsion system (MMPS) according to another embodiment of the present disclosure.

As described later with reference to FIG. 3A, the PDC of FIG. 2A may include an embedded vapor storage zone/chamber for storage of the gaseous propellant for later use/consumption by the RF thruster, RFT. Optionally, and according to some exemplary nonlimiting embodiments of the present disclosure, the multimode propulsion system (MMPS) may include an additional vapor storage chamber/tank, GTK, that as shown in FIG. 2B may be arranged between the PDC and the RF thruster, RFT. In such case, the gaseous propellant generated and stored in the PDC may be first transferred to the additional vapor storage chamber/tank, GTK, of FIG. 2B for later use/consumption by the RF thruster, RFT. It should be noted that the additional vapor storage chamber/tank, GTK, may be external to the PDC as shown in FIG. 2B, or internal/embedded into the PDC in a manner similar to the embedded vapor storage zone/chamber (e.g., shown in FIG. 3A later described) while remaining separate from the latter.

With continued reference to FIG. 2A, operation of the multimode propulsion system (MMPS) according to a high thrust mode provided by the chemical thruster, CT, or high specific impulse mode provided by the (electric) RF thruster, RFT, may include control of a propellant fuel delivery to either the chemical thruster, CT, or the RF thruster, RFT, via a propellant switch/valve system, PSV. In other words, for operation of the chemical thruster, CT, the propellant switch/valve system, PSV, routes the propellant to the chemical thruster, CT, while switching off any fuel delivery to the RF thruster, RFT. On the other hand, for operation of the RF thruster, RFT, the propellant switch/valve system, PSV, routes the propellant to the RF thruster, RFT (i.e., to the PDC) while switching off any fuel delivery to the chemical thruster, CT. More details of the propellant switch/valve system, PSV, including various components of the propellant switch/valve system, PSV, is provided below with reference to FIG. 4.

As shown in FIG. 2A, delivery of the propellant/fuel from the fuel tank, FTK1, to the chemical thruster, CT, or the RF thruster, RFT, is provided through a (propellant) feed system (FS_M, FS_CT, FS_RT). Such feed system is configured to provide an appropriate regulation and pressure (e.g., flow control) of the propellant for delivery to, and operation of, any one of the propellant decomposition chamber, PDC, the chemical thruster, CT, and the RF thruster, RFT. For example, the FS_M branch of the feed system may be configured to deliver the (liquid form of the) propellant from the tank, FTK1, to the propellant switch/valve system, PSV, with sufficient regulation and pressure for operation of the propellant switch/valve system, PSV; the FS_CT branch of the feed system may be configured to deliver the (liquid form of the) propellant from the propellant switch/valve system, PSV, to the chemical thruster, CT, with sufficient regulation and pressure for operation of the chemical thruster, CT; and the FS_RFT branch of the feed system may be configured to deliver the (decomposed into gaseous form of the) propellant from the propellant decomposition chamber, PDC, (or optionally from the gas tank, GTK, of FIG. 2B) to the RF thruster, RFT with sufficient regulation and pressure for operation of the RF thruster, RFT. More details of the branches of the feed system (FS_M, FS_CT, FS_RT) as well as various components of the propellant switch/valve system, PSV, are provided below with reference to FIG. 4.

The feed system (FS_M, FS_CT, FE_RT) shown in FIG. 2A may be designed to feed different types of propellant, including monopropellants, in different forms/phases (e.g., liquid, gas) from/to different components of the multimode propulsion system (MMPS). In particular, the FS_M branch may be configured to feed liquid form of a propellant from the tank, FTK1, to the propellant switch/valve system, PSV; the FS_CT branch may be configured to feed the liquid form of the propellant from the propellant switch/valve system, PSV, to the chemical thruster, CT; and the FS_RFT branch may be configured to feed gas form of a propellant based on a decomposition of the liquid form of the propellant from the propellant switch/valve system, PSV, to the RF thruster, RFT.

Figure 3A:
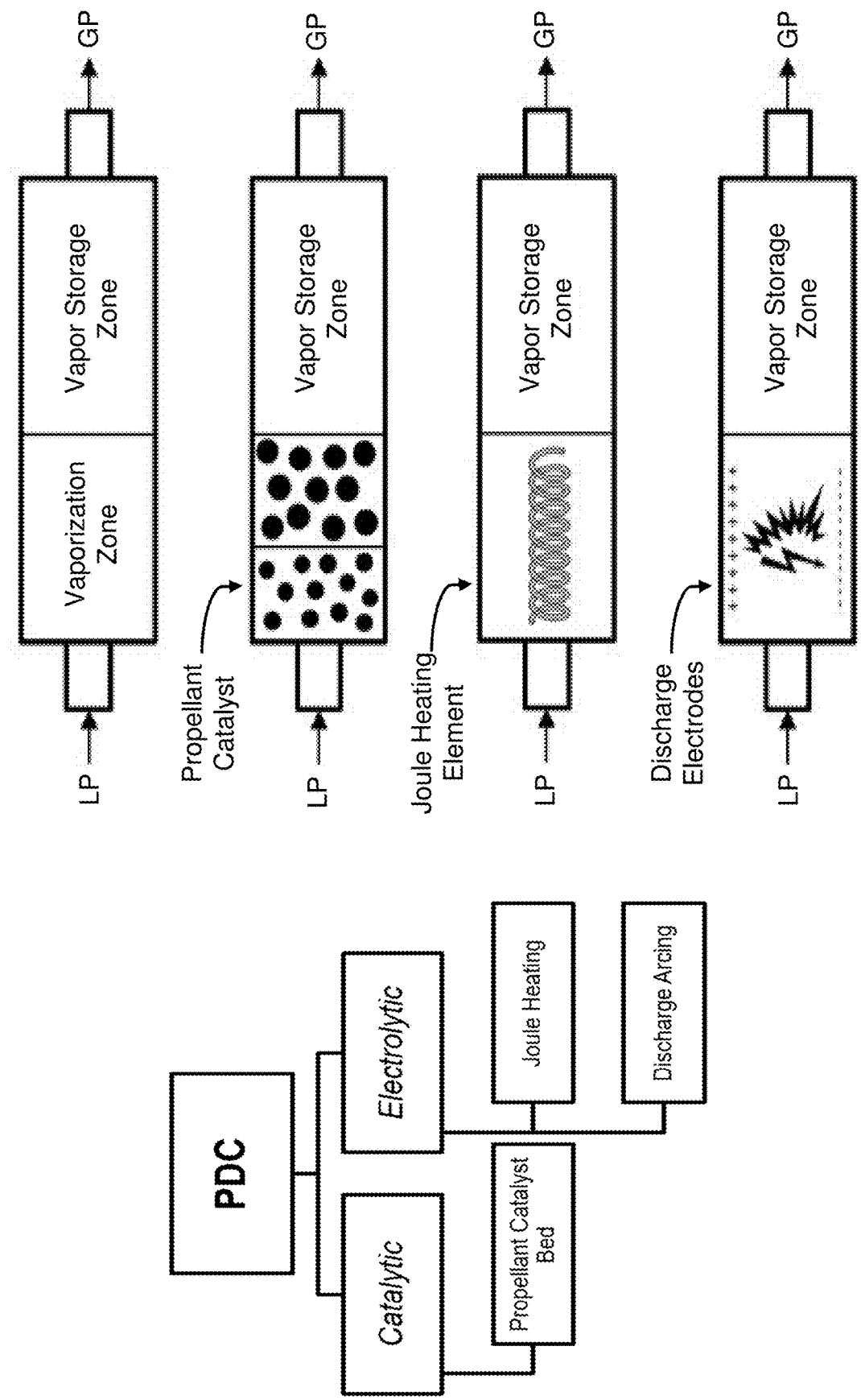
FIG. 3A shows various exemplary embodiments of a propellant decomposition subsystem according to the present disclosure, including a vaporization zone.

FIG. 3A shows various exemplary embodiments of the propellant decomposition subsystem/chamber (PDC) according to the present disclosure. As shown in the left side of FIG. 3A, the propellant decomposition chamber, PDC, may include one or more of a catalytic process or an electrolytic process used for decomposition of a liquid propellant (e.g., part of tank FTK1 of FIG. 2A) to a vapor/gas propellant for use by the RF thruster, RFT (e.g., FIG. 2A). As shown in the left side of FIG. 3A, the catalytic process may include a propellant catalyst bed that targets a specific liquid propellant, whereas the electrolytic process may include heating that may be generated via a joule heating element (e.g., a coil) or discharge arcing that may be generated via discharge electrodes. As shown in the right side of FIG. 3A, the propellant decomposition chamber, PDC, may include a vaporization zone (e.g., FIG. 3B later described) that is configured to receive an amount of liquid propellant (e.g., LP from FTK1) and decompose the liquid propellant via an embedded catalytic and/or electrolytic process, which is subsequently stored in a vapor storage zone/chamber as a vapor/gas propellant (e.g., GP). As shown in the right side of FIG. 3A, the vaporization zone/chamber may include any one or more of a propellant catalyst, a joule heating element, or discharge electrodes, to implement one or more of the catalytic or electrolytic processes.

According to a nonlimiting embodiments of the present disclosure, the vapor storage zone/chamber may be sized according to a target spacecraft requirement for burn duration, which may be as low as seconds (equivalent grams of liquid propellant) and up to hours (equivalent kilograms of liquid propellant). Such sizing may allow to: (initially and quickly) producing a large amount (e.g., up to the size of the vapor storage zone, tens of grams of mass) of the gaseous propellant over a short period of time (up to a few minutes); storing of the produced gaseous propellant in the vapor storage zone/chamber thereby fully or partially filling said chamber with the gaseous propellant; and (slowly) feeding the stored gaseous propellant to the RF thruster, RFT, for consumption/operation throughout the burn duration (up to hours). Once the produced/stored gaseous propellant is fully or substantially consumed, production of additional gaseous propellant for refilling of the vapor storage zone may be reinitiated. Such mode of operation of the PDC may be referred to as a pulsed mode defined by a continuous ON time (interval) of the PDC for production (without consumption) of the gaseous propellant immediately followed by a continuous OFF time (interval) of the PDC where the gaseous propellant is consumed but not produced. Because the ON time may be substantially shorter (e.g., about one order of magnitude) than the OFF time, a corresponding relatively small ON/OFF duty cycle for operation of the PDC may advantageously allow overcoming of any potential thermal and/or chemical issues related to a greater ON/OFF duty cycle of operation of the PDC.

The above-described pulsed mode of operation of the PDC, where one pulse (e.g., for activation of the PDC) with a relatively long ON time may be used to fill the vapor storage zone/chamber of the PDC fully or partially, may not be considered as limiting the mode of operation of the PDC. According to a nonlimiting embodiment of the present disclosure, the overcoming of any potential thermal and/or chemical issues may be satisfied by a combination of a plurality of pulses with relatively shorter ON times such as to maintain a minimum amount/level of the gaseous propellant within the vapor storage zone/chamber while the RF thruster, RFT, operates. In such implementation, the size/volume of the vapor storage zone/chamber may be selected so that incremental injections (e.g., at periodic or nonperiodic time intervals of the plurality of pulses) of new (smaller) amounts of gaseous propellant into the vapor storage zone/chamber may not substantially disturb an established thermal and/or chemical state of the (larger amount of) gaseous propellant present/stored in the vapor storage zone/chamber. The amount (e.g., volume, mass) of each of the incremental injections may be according to (e.g., equal to) an amount of the gaseous propellant consumed by the RF thruster, RFT, since the last incremental injection. In other words, ON times of the plurality of pulses in combination with time intervals between such pulses (e.g., the ON/OFF duty cycle of operation of the PDC), may be configured to maintain a low and/or high watermark level for the amount of gaseous propellant stored in the vapor storage zone/chamber such to provide a continuous operation of the RF thruster, RFT. In such exemplary embodiment, and in contrast to the above-described embodiment according to the pulsed mode of operation of PDC, the PDC ON time may coincide with an ON time (activation) of the RF thruster, RF.

According to a nonlimiting embodiment of the present disclosure, the size of the vapor storage zone/chamber may be small enough to store (e.g., buffer) the amount of each of the above-described incremental injections and not larger. In turn, the buffered amount may be injected (in its entirety) to a separate and larger storage chamber (e.g., tank GTK of FIG. 2B) at corresponding time intervals. Such scheme may be referred to as a two-stage (cascaded) storage configuration, with a first stage storage provided by the vapor storage zone/chamber embedded in the PDC and a second stage storage provided by the larger storage chamber (e.g., tank GTK of FIG. 2B). Such two-stage storage may allow further settling of the propellant gas produced in the first stage at a first time, prior to injection/provision to the second stage at a second/later time. GTK in the figures refers to the additional/external vapor storage tank as described herein for second stage storage.

Figure 3B:
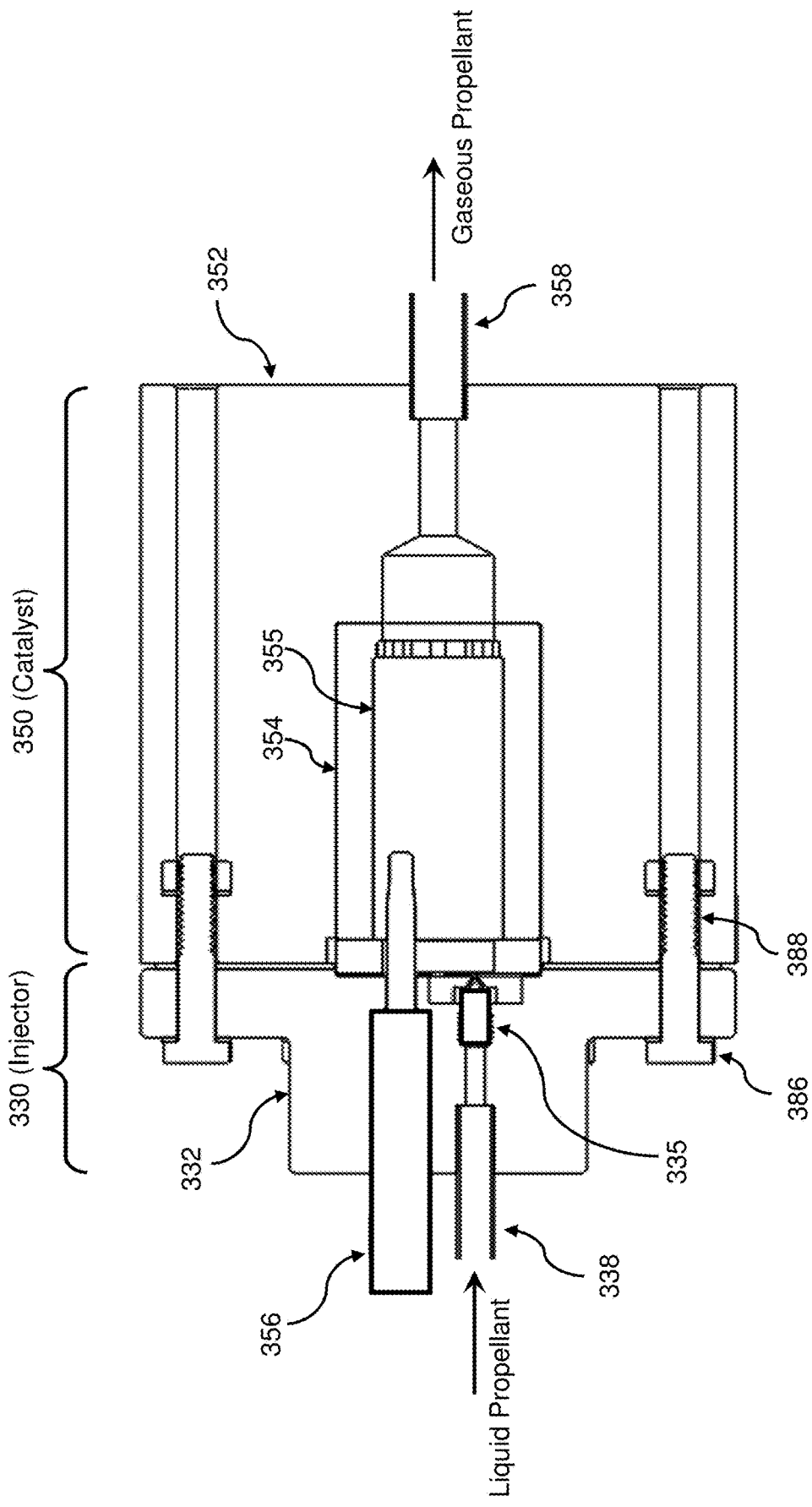
FIG. 3B shows details of an assembly to provide the vaporization zone of the propellant decomposition subsystem.

FIG. 3B shows details of an exemplary assembly (300B) to provide the vaporization zone of the propellant decomposition subsystem, PDC, shown in FIG. 3A. The assembly (300B) may be used to provide a vaporization zone for decomposition of an incoming liquid propellant into a gaseous propellant via either a catalytic process or an electrolytic process. As shown in the assembly (300B) of FIG. 3B, the vaporization zone may include an injector section (330) comprising elements (332, 335, 338) and a catalyst section (350) comprising elements (352, 354, 355, 356, 358). In particular, the injector section (330) may include a housing (332) for assembly/arrangement of: an inlet (338) that is configured to receive an incoming (pressurized) liquid propellant; and a liquid propellant injector (335) that is in (fluidic) communication with the inlet (338) and configured to inject the liquid propellant (at a desired pressure) into the catalyst section (350).

With continued reference to FIG. 3B, the catalyst section (350) may include a housing (352) for assembly/arrangement of: a catalyst liner (354, e.g., a heat shield) that may contain/surround a catalyst chamber (355, e.g., catalyst bed); a catalyst element (356) that may penetrate or make contact with the catalyst chamber (355); and an outlet (358) that is configured to output gaseous propellant (e.g., to the vapor storage zone/chamber of FIG. 3A) that may be decomposed within the catalyst chamber (355). The catalyst element (356) may be, for example, a heating element (e.g., coil) or an electric element (e.g., discharge electrode) to promote the joule heating or discharge arcing described above with reference to FIG. 3A. As shown in FIG. 3B, the two housings (332, 352) may be attached/fastened to one another via a combination of at least a bolt (386) and a threaded channel (388, e.g., formed in the housing 352). Although not shown in FIG. 3B, the vapor storage zone/chamber of the propellant decomposition subsystem, PDC, shown in FIG. 3A may be further attached/fastened to the housing (352) and include an inlet/opening that is in (fluidic) communication with the outlet (358).

It is noted that the propellant decomposition chamber, PDC, may decompose the liquid propellant to any vapor/gas form in view of a performance characteristic of the RF thruster, RFT. In particular, in some embodiments of the present disclosure, the propellant decomposition chamber, PDC, may partially, and not fully/entirely, decompose the liquid propellant in order to output a vapor/gas propellant that optimizes a performance (e.g., efficiency) of the RF thruster, RFT. In other words, in some embodiments according to the present disclosure, the propellant decomposition chamber, PDC, may not decompose (or combust) the liquid propellant to smallest individual constituents (i.e., N2 and H2 obtained from hydrazine decomposition) of a propellant gas, rather decompose the liquid propellant to more complex gas components (i.e., NH3 for Hydrazine decomposition) that when provided to the RF thruster, RFT, may optimize performance to the RF thruster, RFT. In other words, the propellant decomposition chamber, PDC, may allow for tuning of the exhaust chemistry (used as input propellant to the RFT) to optimize RF thruster, RFT, performance.

According to an embodiment of the present disclosure, tuning of the exhaust chemistry (e.g., decomposed gas) may be provided by: a mass flow rate of the (liquid) propellant input to the catalyst chamber (e.g., 355 of FIG. 3B) via the injector (e.g., 330 of FIG. 3B); a choice of the catalyst used in the catalyst chamber (e.g., 355 of FIG. 3B) of the catalyst (e.g., 350 of FIG. 3B); and a temperature of the catalyst chamber (e.g., 355 of FIG. 3B) during decomposition of the (liquid) propellant. Because the exhaust chemistry (e.g., decomposed gas) may be heated at very high temperatures (e.g., superheated within the catalyst chamber), the vapor storage zone/chamber (e.g., FIG. 3A) may serve as a a thermal sink to drop the temperature to a range that may be acceptable by the RF thruster, RFT. Further control of the temperature and mass flow rate of the decomposed gas for use by the RF thruster, RFT, may be provided by the downstream feed system (e.g., FS_RFT of FIG. 2A).

Figure 4:
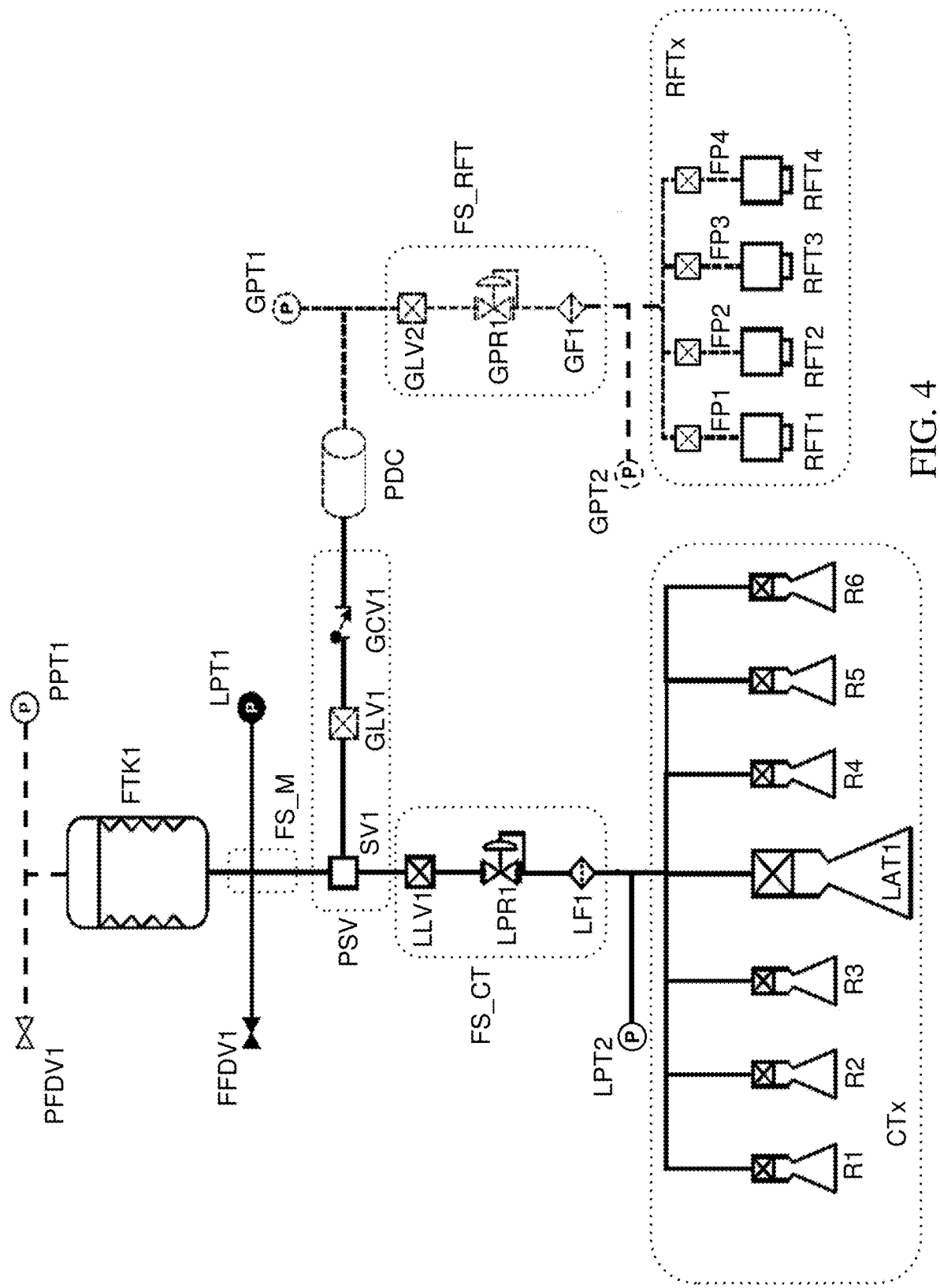
FIG. 4 shows further details of the multimode propulsion system (MMPS) of FIG. 2A.

FIG. 4 shows further details of the multimode propulsion system (MMPS) of FIG. 2A (or of FIG. 2B with the addition of the optional gas tank, GTK). These include details of each of the components of propellant switch/valve system, PSV, the propellant feed system (FS_M, FS_CT, FS_RT), as well as pressurization (PFDV1), filling and drainage (FFDV1) of the propellant tank, FTK1, and various pressure monitoring gauges/transducers (PPT1, LPT1, LPT2, GPT1, GPT2). It is noted that although not shown in FIG. 4 (or other figures of the present disclosure), the various components/elements used in the present multimode propulsion system (MMPS) may include interfaces to allow control and/or monitoring of such components/elements. For example, status of pressure gauges/transducers may be read to control pressure in the propellant feed system via pressure regulators, or valves may be closed/opened to control/restrict flow of propellant to the chemical thruster(s), CTx, or RF thruster(s), RFTx. Furthermore, safety measures may be implemented via selection of the components/elements that during their respective power off conditions may provide appropriate (flow) states.

As shown in FIG. 4, filling and draining of fuel/propellant into the propellant tank, FTK1, may be provided via a fuel fill and drain valve, FFDV1, through the FS_M branch of the propellant feed system that connects one end of the propellant tank, FTK1, to the propellant switch/valve system, PSV. Propellant pressure within the FS_M branch may be monitored through a liquid pressure transducer, LPT1. Furthermore, as shown in FIG. 4, pressuring of the propellant tank, FTK1, may be provided through a pressurant gas (e.g., helium) input into the tank, FTK1, through a pressurant fill and drain valve, PFDV1, connected at a second end of the propellant tank, FTK1. Pressure at the second end of the propellant tank, FTK1, may be monitored through a gas/pressurant pressure transducer, PPT1. It is noted that the combination of the liquid pressure transducer, LPT1, and gas/pressurant pressure transducer, PPT1, may allow to monitor a pressure differential between the two ends of the propellant tank, FTK1.

With continued reference to FIG. 4, the propellant switch/valve system, PSV, may include, in series connection, a (normally closed) squib valve, SV1, a latch valve, GLV1, and a check valve, GCV1. The normally closed squib valve, SV1, may ensure that no (liquid) propellant flows/leaks to either (direction of) the chemical thruster, CT, or the RF thruster, RFT, when the multimode propulsion system (MMPS) is not in operation. On the hand, during operation, the squib valve, SV1, may be activated to allow flow of the (liquid) propellant to the direction of both the chemical thruster, CT, and the RF thruster, RFT. When the squib valve, SV1, is activated, selection of propellant flow to the RF thruster, RFT, may be provided via a latch (i.e., isolation) valve, GLV1. When the latch valve, GLV1, is activated, propellant may flow towards the propellant decomposition chamber, PDC, for decomposition into gas. A gas check (i.e., nonreturn) valve, GCV1, is series connection between the latch valve, GLV1, and propellant decomposition chamber, PDC, may be used to prevent any gas leaking back from the propellant decomposition chamber, PDC, in the direction of the squib valve, SV1 (i.e., FTK1 and/or CT).

It is noted that the propellant decomposition chamber, PDC, may require a certain (range of) input flow of input liquid propellant to provide an adequate flow of gas propellant to the RF thruster, RFT. According to an embodiment of the present disclosure such input flow may be regulated via a (liquid) regulator (not shown in FIG. 4) that may be part of the propellant decomposition chamber, PDC, the propellant switch/valve system, PSV, or in series connection between the propellant switch/valve system, PSV, and the propellant decomposition chamber, PDC.

As shown in FIG. 4, feed system branches FS_CT and FS_RFT respectively provide (control of) flow of liquid and gas propellant to the chemical thruster, CT, and RF thruster, RFT. Such flow may be activated (on or off) via respective liquid and gas check valves, LLV1 and GLV2, and may be regulated via respective liquid and gas pressure regulators, LPR1 and GPR1. Final propellant input to the chemical thruster, CT, and RF thruster, RFT, may be filtered via respective liquid and gas filters, LF1 and GF1. Accordingly, each of the feed system branches FS_CT and FS_RT include, in series connection, a check valve (LLV1 or GLV2), a pressure regulator (LPR1 or GPR1) and a filter (LF1 or GF1) that are designed for a corresponding form of fluid (liquid phase for FS_CT or gas phase for FS_RT). It is noted that the series connected check valve (LLV1 or GLV2) and pressure regulator (LPR1 or GPR1) may advantageously provide for what is termed a "dual fault tolerance" for range compliance of the present multimode propulsion system (MMPS) in addition to any internal fault tolerance that may be built into the respective thrusters. Dual fault tolerance is an example of a failure mode requirement for a pressurized system such as the one contemplated here. Other systems require a "triple fault tolerance" for range compliance, depending on the type of propellant used in said pressurized system as the one contemplated here.

With continued reference to FIG. 4, according to an embodiment of the present disclosure, during a first processing step of the multimode propulsion system (MMPS) for operation of the RF thruster, RFT, liquid propellant may be supplied (e.g., at 400 PSIA and at a storage temperature) from the propellant tank, FTK1, to the squib valve, SV1, (assuming SV1 has been expended during a system initialization step). During a second processing step of the multimode propulsion system (MMPS) for operation of the RF thruster, RFT, the liquid check valve, LLV1, remains closed, the latch valve, GLV1, and check valve, GCV1, are opened for a propellant decomposition chamber, PDC, filling time duration (e.g., in seconds) and then closed, wherein during the propellant decomposition chamber, PDC, filling time, sufficient liquid propellant (e.g., at 400 PSIA and at the storage temperature) for operation of the RF thruster, RFT, (e.g., burn/thrust duration) flows to the (vaporization zone/chamber of the) propellant decomposition chamber, PDC. During a third processing step of the multimode propulsion system (MMPS) for operation of the RF thruster, RFT, the liquid propellant in the propellant decomposition chamber, PDC, is partially combusted/decomposed and stored as a vapor/gas in the (vapor storage zone/chamber of the) propellant decomposition chamber, PDC. During a fourth processing step of the multimode propulsion system (MMPS) for operation of the RF thruster, RFT, once a target vapor/gas pressure (e.g., in PSIA) is achieved at pressure gauge, GPT1, the check valve, GLV2, is opened for an RFT activation time period (e.g., in seconds) and then closed, wherein during the RFT activation time, the pressurized gaseous propellant is fed to the RF thruster, RFT, for generation of thrust.

It should be noted that during the fourth processing step, the gaseous propellant may be selectively provided (e.g., via a propellant management unit, PMU) to any one or more of the RF thrusters (RFT1, . . . , RFT4) of the RFT by selectively enabling/activating a corresponding propellant flow path (FP1, FP2, FP3, FP4). According to an exemplary embodiment of the present disclosure, activation of the propellant flow path, optionally including of a thruster specific propellant flow (e.g., pressure and mass flow) through the activated propellant flow path, may be provided via, for example, a manifold assembly (not shown in FIG. 4) that distributes/controls propellant flow to the propellant flow paths (FP1, FP2, FP3, FP4) or individual valves (e.g., isolation valves or other, shown in FIG. 4 as crossed boxes along the respective flow paths) arranged along each of the propellant flow paths (FP1, FP2, FP3, FP4). Such manifold assembly or individual valves, as well as the FS_RFT branch of the propellant feed system may be considered as part of the propellant management unit, PMU (for the RFT thrusters). As used in the present context, the propellant management unit, PMU, may be considered to encompass all hardware and software that is configured to control direction and delivery of gaseous propellant flow to one or more of the RF thrusters (RFT1, . . . , RFT4) at a specific mass flow rate (e.g., pressure and mass flow) needed for operation of each of the one or more RF thrusters.

The multimode propulsion system (MMPS) according to the present teachings may be scalable in number of chemical thrusters, CT, or RF thrusters, RFT. In other words, as shown in FIG. 4, the same propellant tank, FTK1, and feed system (FS_M, FS_CT, FS_RFT) may provide liquid or gas propellant to operate more than one chemical and/or (electric) RF thruster. For example, as shown in FIG. 4, the CT may be considered as a chemical thruster system that may include a plurality of independently controlled chemical thrusters (R1, . . . , R6, LAT1) and the RFT may be considered as a RF thruster system that may include a plurality of independently controlled (electric) RF thrusters (RFT1, . . . , RFT4). Although such thrusters can be activated independently, they may operate in unison as a group (or subgroup) to provide a desired orbital maneuver based on a layout/physical arrangement of the thrusters on a vessel.

Figure 5:
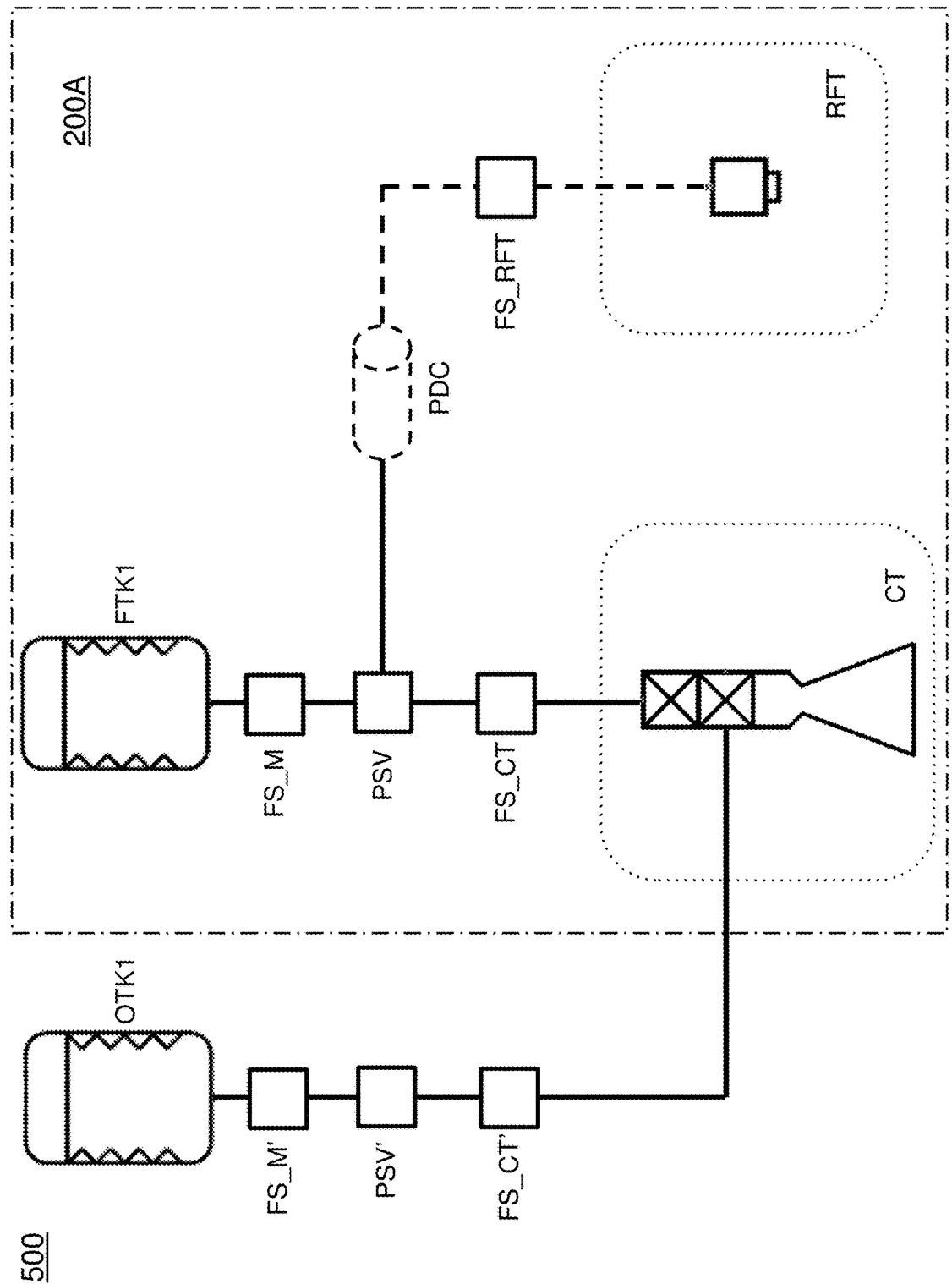
FIG. 5 shows a simplified block diagram of a multimode propulsion system (MMPS) according to another embodiment of the present disclosure.

As shown in the configuration (500) of FIG. 5, teachings according to the present disclosure may allow addition of a second (e.g., auxiliary) tank, OTK1, to the multimode propulsion system (200A, MMPS) described above with reference to FIG. 2A. According to an embodiment of the present disclosure, the second tank may be used as a fuel additive, such as an oxidizer, for (a higher performance of) operation of the chemical thruster, CT (e.g., use of a bipropellant). Use of oxidizers as additives to a main fuel/propellant for operation of a chemical thruster is well known in the art and therefore not the subject of the present disclosure. Typical oxidizers used may include, for example, liquid oxygen or nitrogen tetroxide.

With continued reference to FIG. 5, flow and regulation of the propellant (e.g., oxidizer) from the second tank, OTK1, to the chemical thruster, CT may be provided by elements (FS_M', PSV', FS_CT') than may mimic functionality of elements (FS_M, PSV, FS_CT) described above with reference to, for example, FIG. 2A, that provide flow control of (main) propellant from the propellant tank, FTK1, to the chemical thruster, CT. Although not shown in FIG. 5, according to an embodiment of the present disclosure, the propellant from the second tank, in vapor form/phase, may also be used as an additive, or as an alternative propellant (e.g., main fuel), to operate the RF thruster, RFT. In this case, a feed system and switch/valve system (e.g., PSV) that delivers propellant from the second tank, OTK1, to the chemical thruster, CT, and RF thruster, RFT, may be duals of those described above with reference to FIG. 2A and FIG. 4, thereby providing parallel flow control paths to those provided between the tank, FTK1, and the chemical thruster, CT, and RF thruster, RFT.

Figure 6:
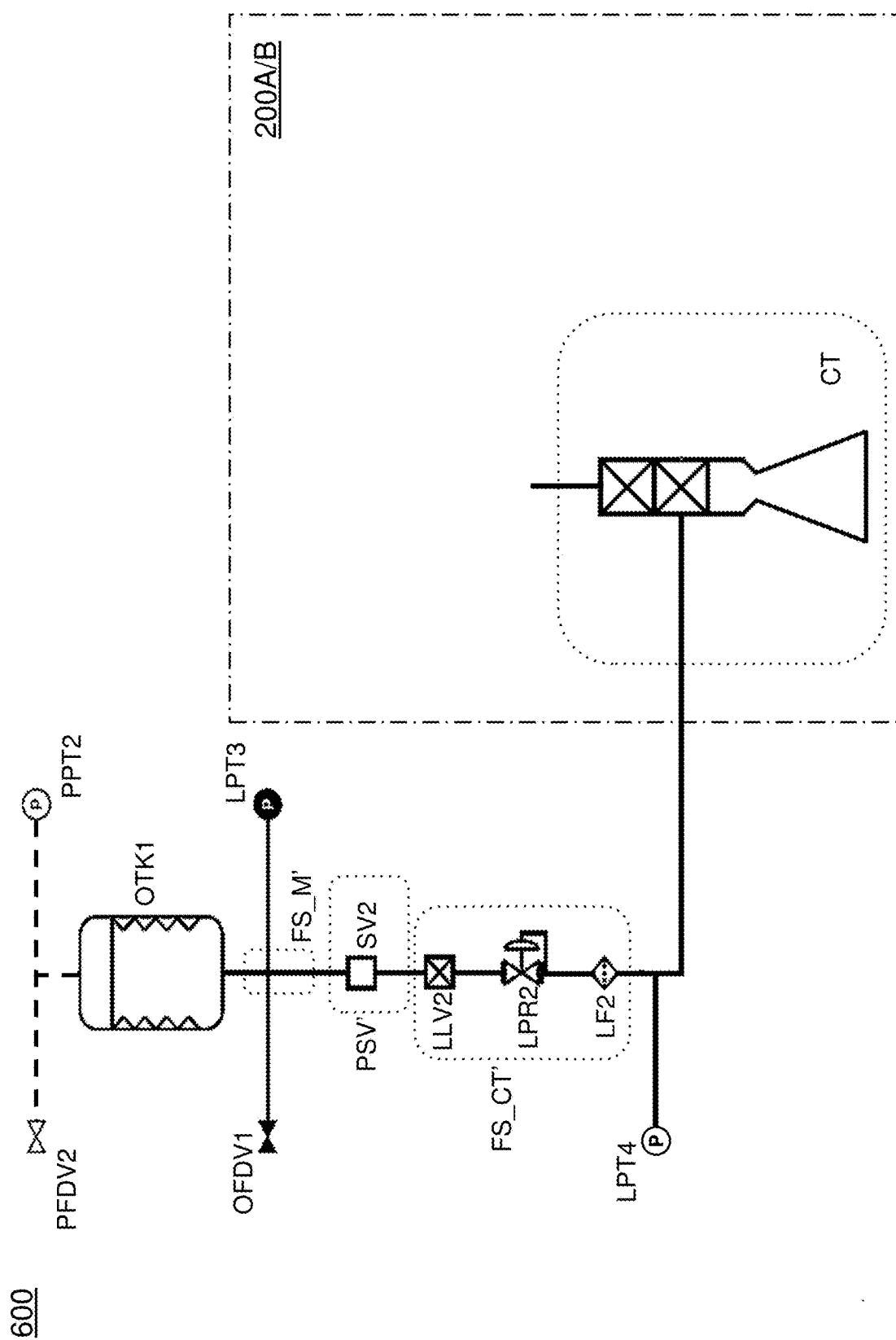
FIG. 6 shows further details of the multimode propulsion system (MMPS) of FIG. 5.

As shown with more details in FIG. 6, filling and draining of propellant (e.g., oxidizer) into the second tank, OTK1, may be provided via a fill and drain valve, OFDV1, through the FS_M' branch of a feed system (FS_M', FS_CT') that connects one end of the second tank, OTK1, to the propellant switch/valve system, PSV'. Liquid pressure within the FS_M' branch may be monitored through a liquid pressure transducer, LPT3. Furthermore, as shown in FIG. 6, pressuring of the second tank, OTK1, may be provided through a pressurant gas (e.g., helium) input into the tank through a pressurant fill and drain valve, PFDV2, connected at a second end of the second tank, OTK1. Pressure at the second end of the second tank, OTK1, may be monitored through a gas/pressurant pressure transducer, PPT2. It is noted that the combination of the liquid pressure transducer, LPT3, and gas/pressurant pressure transducer, PPT2, may allow to monitor a pressure differential between the two ends of the second tank, OTK1.

With continued reference to FIG. 6, the switch/valve system, PSV', may include, a (normally closed) squib valve, SV2, that may prevent propellant flows/leaks to a direction of the chemical thruster, CT when the multimode propulsion system (600 of FIG. 6, MMPS) is not in operation, or when no propellant (e.g., oxidizer) from the second tank, OTK1, is required for operation of the chemical thruster, CT. On the hand, during operation that requires the propellant from the second tank, OTK1, the squib valve, SV2, may be activated to allow flow of the (liquid) propellant from the second tank, OTK1, into the chemical thruster, CT. In this case, as shown in FIG. 6, flow of the propellant is provided via a FC_CT' branch of the feed system (FS_M', FS_CT') that includes, in series connection, a check valve, LLV2, a pressure regulator, LPR2, and a filter, LF2, that may be likened to elements (LLV1, LPR1, LF1) described above with reference the branch FC_CT of FIG. 4. Furthermore, liquid pressure out of the FC_CT' branch may be monitored (and therefore adjusted via LPR2) via a pressure monitoring gauge/transducer, LPT4 that is connected at the end of the FC_CT' branch where connection to the chemical thruster, CT, is made.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The invention claimed is:

1. A multimode propulsion system, comprising:
a propellant tank configured to contain a liquid propellant;
a chemical thruster configured for operation with the liquid propellant;
an electric thruster configured for operation with a vaporized form of the liquid propellant;
a propellant decomposition chamber configured to transform the liquid propellant into the vaporized form of the liquid propellant, the propellant decomposition chamber comprising a vaporization zone configured to perform the catalytic process and/or the electrolytic process, and a vapor storage zone configured to store the vaporized form of the liquid propellant;

an additional vapor storage zone arranged between the propellant decomposition chamber and the electric thruster, and a propellant feed system configured to provide flow paths for the liquid propellant and the vaporized form of the liquid propellant between the propellant tank, the chemical thruster, the electric thruster and the propellant decomposition chamber, wherein an inner volume of the additional vapor storage zone is larger than an inner volume of the vapor storage zone.

2. The multimode propulsion system of claim 1, wherein:
the propellant decomposition chamber is configured to transform the liquid propellant into the vaporized form via a combination of a catalytic process and/or an electrolytic process.

3. The multimode propulsion system of claim 1, wherein: the vaporized form includes a single species gas.

4. The multimode propulsion system of claim 3, wherein: the electric thruster is configured for targeted ionization of one species of the multiple species gas.

5. The multimode propulsion system of claim 1, wherein: the vaporized form includes multiple species gas.

6. The multimode propulsion system of claim 1, further comprising:
a propellant switch/valve system that is configured to selectively activate flow of the liquid propellant from the propellant tank in a direction of the chemical thruster and the propellant decomposition chamber.

7. The multimode propulsion system of claim 6, wherein: the propellant switch/valve system includes a normally closed squib valve.

8. The multimode propulsion system of claim 7, wherein:
the propellant switch/valve system further includes a liquid latch valve and a gas check valve in series connection between the normally closed squib valve and the propellant decomposition chamber, and
the gas check valve is configured to prevent gas leak from the propellant decomposition chamber in a direction of the squib valve.

9. The multimode propulsion system of claim 6, wherein the propellant feed system comprises:
a first flow path coupled between the propellant switch/valve system and the chemical thruster that is configured to control flow of the liquid propellant to the chemical thruster, and
a second flow path coupled between the propellant decomposition chamber and the electric thruster that is configured to control flow of the vaporized form of the liquid propellant to the electric thruster.

10. The multimode propulsion system of claim 9, wherein:
each of the first and second flow paths includes a check valve and a pressure regulator in series connection.

11. The multimode propulsion system of claim 10, wherein:
each of the first and second flow paths includes a filter.

12. The multimode propulsion system of claim 1, wherein:
the electric thruster is an electrodeless electric thruster that is configured to ionize the vaporized form of the liquid propellant via inductive heating and produce a primary source of thrust by ambipolar acceleration of resulting ions.

13. The multimode propulsion system of claim 12, wherein:
the thrust produced by the ambipolar acceleration of the resulting ions is in a range from 5 millinewtons (mN) to 10 mN.

14. The multimode propulsion system of claim 13, wherein:
a specific impulse provided by the electric thruster is in a range from 400 seconds to 800 seconds.

15. The multimode propulsion system of claim 13, wherein:
a specific impulse provided by the electric thruster is greater than 800 seconds.

16. The multimode propulsion system of claim 1, further comprising:
an auxiliary tank configured to contain a liquid propellant additive for operation of the chemical thruster; and
an auxiliary feed system configured to provide a flow path for the liquid propellant additive between the auxiliary tank and the chemical thruster.

17. The multimode propulsion system of claim 1, further comprising:
additional one or more chemical thrusters configured for operation with the liquid propellant; and
additional one or more electric thrusters configured for operation with the vaporized form of the liquid propellant;
wherein the flow paths of the propellant feed system are shared for provision of:
the liquid propellant to the chemical thruster and the additional one or more chemical thrusters, and
the vaporized form of the liquid propellant to the electric thruster and the additional one or more electric thrusters.

18. The multimode propulsion system of claim 17, wherein:
each of the additional one or more chemical thrusters or electric thrusters are configured for independent operation.

19. The multimode propulsion system of claim 17, wherein:
any two or more of the additional one or more chemical thrusters or electric thruster are configured for operation at a same time.

20. The multimode propulsion system of claim 1, wherein the liquid propellant comprises at least one of:
high purity hydrazine (HPH); AF-M315E (ASCENT); high test peroxide (HTP); nitrogen tetroxide (NTO), ammonium dinitramide (AND); LMP-103S; red fuming nitric acid (RFNA); nitrous oxide (N2O); monomethyl-hydrazine (MMH); ethane (C2H6); or kerosene.

21. The multimode propulsion system of claim 1, wherein:
the vaporization zone comprises at least one of: a propellant catalyst; a joule heating element; or discharge electrodes.

22. A method for operating a multimode propulsion system, comprising:
providing a chemical thruster;
providing a liquid propellant for operation of the chemical thruster;
storing the liquid propellant in a storage tank;
providing an electric thruster;

during a first mode of operation of the multimode propulsion system:
  feeding the liquid propellant to the chemical thruster for producing a first thrust; and
during a second mode of operation of the multimode propulsion system:
  decomposing the liquid propellant into a vaporized form;
  storing the vaporized form of the liquid propellant into a first vapor storage zone;
  feeding the vaporized form of the liquid propellant from the first vapor storage zone to a second vapor storage zone; and
  feeding the vaporized form of the liquid propellant from the second vapor storage zone to the electric thruster for producing a second thrust,
wherein the electric thruster is an electrodeless electric thruster that is configured to ionize the vaporized form of the liquid propellant via inductive heating and produce a primary source of the second thrust by ambipolar acceleration of resulting ions, and
wherein an inner volume of the second vapor storage zone is larger than an inner volume of the first vapor storage zone.

23. The method according to claim 22, wherein:
the decomposing of the liquid propellant is performed prior to the producing of the second thrust.

24. The method according to claim 22, wherein:
the decomposing of the liquid propellant is performed concurrently to the producing of the second thrust.

* * * * *